US010089732B2

(12) United States Patent
Ishikawa et al.

(10) Patent No.: US 10,089,732 B2
(45) Date of Patent: Oct. 2, 2018

(54) IMAGE PROCESSING APPARATUS, IMAGE PROCESSING METHOD AND NON-TRANSITORY COMPUTER-READABLE STORAGE MEDIUM

(71) Applicant: CANON KABUSHIKI KAISHA, Tokyo (JP)

(72) Inventors: Tomokazu Ishikawa, Yokohama (JP); Wakako Tanaka, Inagi (JP); Tetsuya Suwa, Yokohama (JP); Shinjiro Hori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/493,526

(22) Filed: Apr. 21, 2017

(65) Prior Publication Data
US 2017/0316559 A1    Nov. 2, 2017

(30) Foreign Application Priority Data

May 2, 2016 (JP) .................................. 2016-092798

(51) Int. Cl.
  *G06K 9/00* (2006.01)
  *G06T 7/00* (2017.01)
  *G06T 7/77* (2017.01)
(52) U.S. Cl.
  CPC .............. *G06T 7/0002* (2013.01); *G06T 7/77* (2017.01); *G06T 2207/10008* (2013.01); *G06T 2207/30168* (2013.01)
(58) Field of Classification Search
  CPC ..................... G06T 7/0002; G06T 7/77; G06T 2207/10008; G06T 2207/30168
  See application file for complete search history.

(56) References Cited

U.S. PATENT DOCUMENTS 8,503,031 B2  8/2013  Kajihara
8,619,319 B2  12/2013 Tsuchiya
(Continued)

FOREIGN PATENT DOCUMENTS

EP    0 849 934    6/1998
JP    2008-9549    1/2008
JP    2013-135244  7/2013

OTHER PUBLICATIONS

U.S. Appl. No. 15/482,183, filed Apr. 7, 2017.
(Continued)

*Primary Examiner* — Shefali Goradia
(74) *Attorney, Agent, or Firm* — Fitzpatrick, Cella, Harper & Scinto

(57) ABSTRACT

An image processing apparatus for detecting a singular point from image data having a plurality of pixel signals arranged in a two-dimensional manner, having a stochastic resonance processing unit configured to perform parallel steps in each of which a noise is added to and the result is subjected to binarization processing, synthesize the results of the parallel steps and output the result, with regard to each of the plurality of pixel signals; and a unit configured to detect the singular point based on the output signal value from the stochastic resonance processing unit for each of the plurality of pixel signals. The stochastic resonance processing unit performs the binarization processing on a pixel as a processing target among the plurality of pixel signals based on the pixel signal of the pixel as the processing target and a pixel signal of a pixel adjacent to the pixel as the processing target in a predetermined direction.

19 Claims, 16 Drawing Sheets

(56) References Cited

U.S. PATENT DOCUMENTS

| | | |
|---|---|---|
| 8,830,530 B2 | 9/2014 | Sano |
| 9,064,202 B2 | 6/2015 | Tanaka |
| 9,087,291 B2 | 7/2015 | Hori |
| 9,092,720 B2 | 7/2015 | Nakagawa |
| 9,210,292 B2 | 12/2015 | Miyake |
| 9,287,962 B2 | 3/2016 | Kasai |
| 9,576,769 B2 * | 2/2017 | Kanai ............... H01J 37/22 |
| 9,623,670 B2 | 4/2017 | Kagawa |
| 9,649,839 B2 | 5/2017 | Ishikawa |
| 2007/0280551 A1 * | 12/2007 | Oztan ............... H04N 19/86 382/268 |
| 2010/0020204 A1 * | 1/2010 | Fleischer ........... G01R 33/0029 348/241 |
| 2012/0278039 A1 | 11/2012 | Peng |
| 2017/0004360 A1 | 1/2017 | Tanaka |
| 2017/0004375 A1 | 1/2017 | Ikeda |
| 2017/0004376 A1 | 1/2017 | Hori |
| 2017/0004614 A1 | 1/2017 | Suwa |
| 2018/0048917 A1 * | 2/2018 | Metzler ................ H04N 19/91 |

OTHER PUBLICATIONS

J.J. Collins, et al., "Stochastic resonance without tuning", Nature, (UK), Jul. 20, 1995, vol. 376, p. 236-238.

M. Hongler, et al., "The Resonant Retina: Exploiting Vibration Noise to Optimally Detect Edges in an Image", IEEE, vol. 25, No. 9, pp. 1051-1062, Sep. 2003.

G. Maragatham, et al., "PSO-based stochastic resonance for automatic contrast enhancement of images", pp. 207-214, Springer-Verlag London, Dec. 10, 2014.

C. Ryu, et al., "Enhancement of feature extraction for low-quality fingerprint images using stochastic resonance", Pattern Recognition Letters 32 (2011) pp. 107-113.

European Search Report dated Aug. 31, 2017 during prosecution of related European application No. 17000634.0-1906.

* cited by examiner

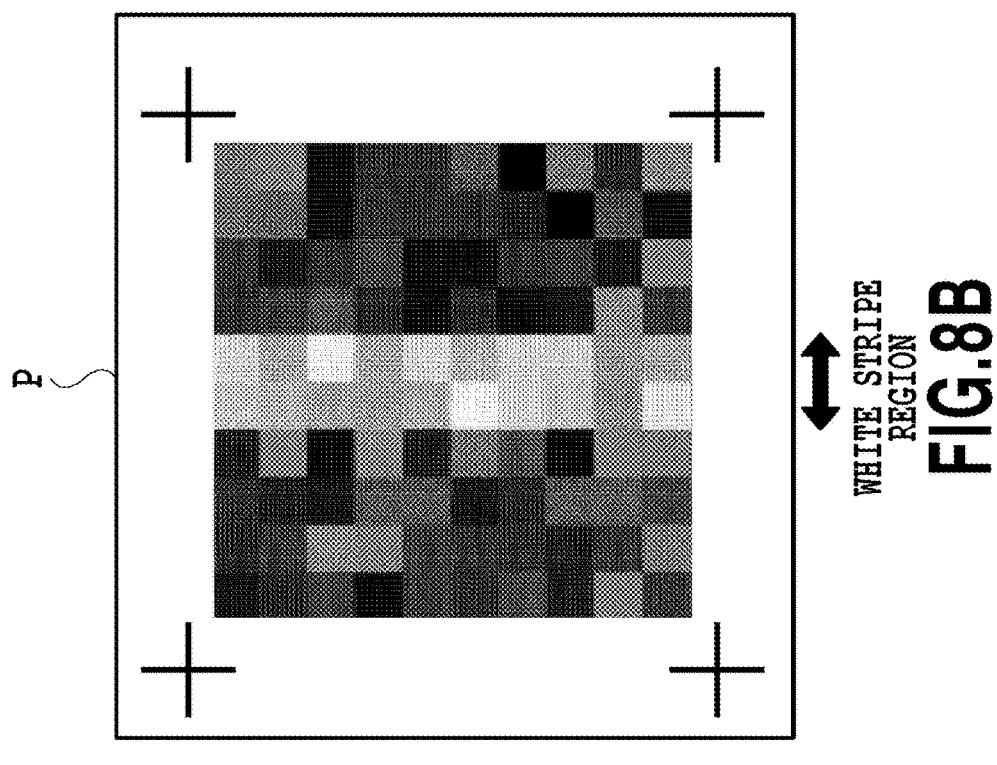
P
WHITE STRIPE REGION
FIG.8B
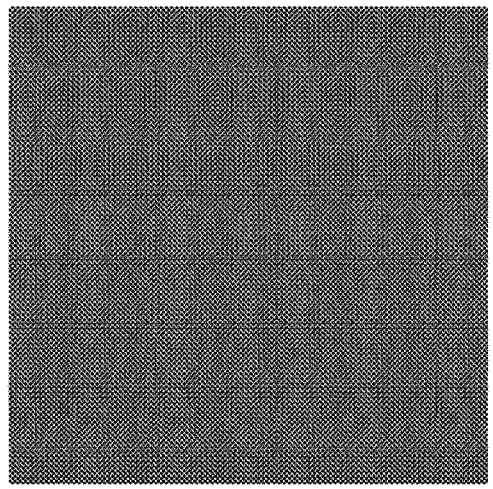
FIG.8A
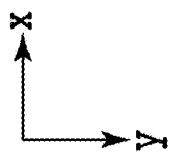

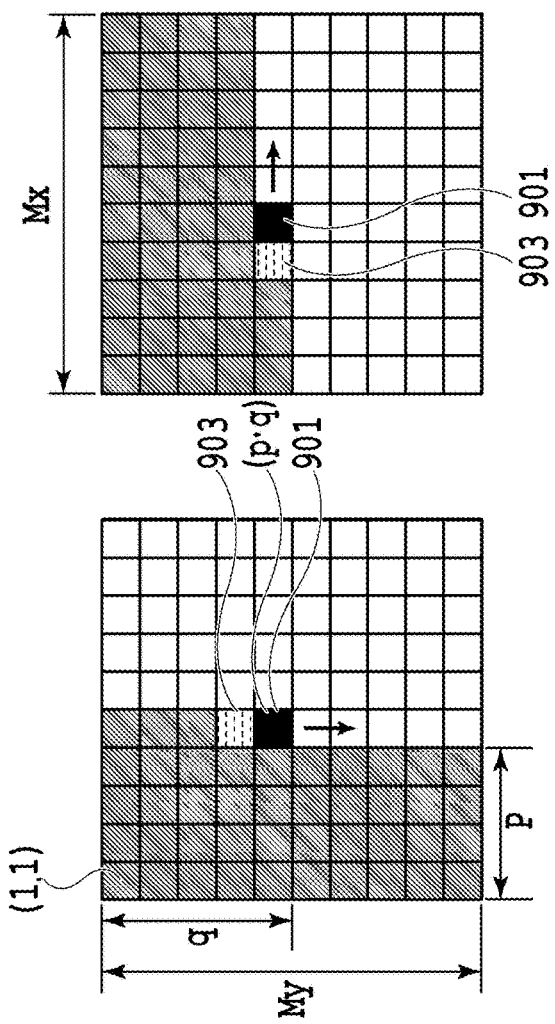

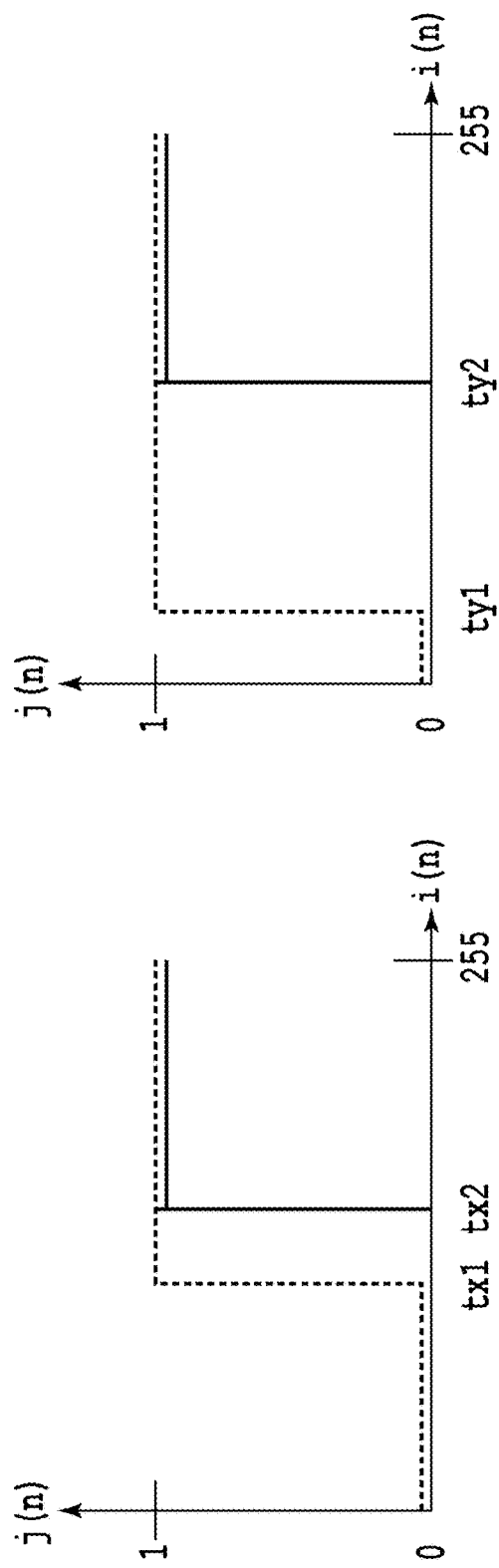

IMAGE PROCESSING APPARATUS, IMAGE PROCESSING METHOD AND NON-TRANSITORY COMPUTER-READABLE STORAGE MEDIUM

BACKGROUND OF THE INVENTION

Field of the Invention

The present invention relates to an image processing apparatus and an image processing method to detect a singular point included in an inspection target image.

Description of the Related Art

In order to extract a detection target signal from an input signal buried in noise, a stochastic resonance phenomenon is useful. The stochastic resonance phenomenon is a phenomenon in which an input signal buried in noise is further added with noise and the resultant signal is subsequently subjected to a nonlinear processing to thereby emphasize a detection target signal. However, in such a stochastic resonance phenomenon, a correlation coefficient used as an evaluation value showing the performance of the detection result changes depending on the strength of the added noise as shown in FIG. 1. In the case of FIG. 1, the correlation coefficient is maximum when the added noise strength is 30. That is, the noise strength is desirably tuned because of the existence of the noise strength optimal for the realization of the maximum detection accuracy.

J. J. Collins, Carson C. Chow and Thomas T. Imhoff, "Stochastic resonance without tuning", NATURE, (UK), 20 Jul. 1995, vol. 376, p. 236-238 (hereinafter referred to as the Non-Patent document) discloses a configuration as shown in FIG. 2 in which an input signal I(x) is branched to a plurality of pieces and different noises are added to the respective pieces and the resultant pieces are subjected to a nonlinear processing to further synthesize the outputs thereof to thereby detect a detection target signal at a stable accuracy. The Non-Patent document describes that the increase of the branches allows the correlation coefficient to be stabilized regardless of the strength, which eliminates the peak as shown in FIG. 1, thus resulting in the elimination of the need to tune the noise strength. Japanese Patent Laid-Open No. 2013-135244 discloses a configuration in which an independent noise generation source as in the Non-Patent document is not prepared and noise generated by one noise generation source is added by being mutually delayed by a plurality of signal lines, thereby providing the same effect as that of the Non-Patent document.

In recent years, the extraction of a detection target signal using the stochastic resonance phenomenon as described above also may be used for the product inspection for example. For example, a produced product can be imaged and the resultant image data is added with predetermined noise and the resultant data is subjected to a nonlinear processing, thereby extracting a singular portion such as a flaw existing in the product. Then, by providing the singular portion extraction step as described above, a step of popping up the extracted singular portion, and a step of allowing an inspector to confirm the popped-up image to finally determine the image, the inspection time can be substantially reduced and the inspection accuracy can be improved when compared with a case where the image is determined only by the visual determination by the inspector. Furthermore, the singular portion extraction mechanism as described above is not limited to the inspection step in a production site but also can be used for a product itself. Specific examples include a mechanism of a personal printer which prints an image, images the printed image and automatically extracts, if any, a defective portion.

Japanese Patent Laid-Open No. 2008-9549 discloses a method according to which read image data is subjected to a nonlinear processing based on a reaction diffusion model to thereby preferably perform edge detection or region division. The reaction diffusion model means a processing to reflect the result of the image processing of the individual pixels upon a processing to not-yet-processed peripheral pixels. The reaction diffusion model will be hereinafter called as a hysteresis processing. The introduction of the hysteresis processing provides the effective extraction of a singular portion extending in a plurality of continuous pixels from image data buried in noise.

However, in a case where the direction of a to-be-extracted singular portion (white stripe) is known in advance as in the detection of ejection failures of an inkjet printing head for example, the use of the isotropic hysteresis processing disclosed in Japanese Patent Laid-Open No. 2008-9549 may not provide a sufficient detection accuracy.

SUMMARY OF THE INVENTION

The present invention has been made in order to solve the above disadvantage. Thus, it is an objective of the invention to provide an image processing apparatus and an image processing method by which a predetermined singular portion can be extracted from an inspection target image accurately and efficiently.

According to a first aspect of the present invention, there is provided an image processing apparatus for detecting a singular point from image data having a plurality of pixel signals arranged in a two-dimensional manner, comprising: a stochastic resonance processing unit configured to perform parallel steps in each of which a noise is added to and the result is subjected to binarization processing, synthesize the results of the parallel steps and output the result, with regard to each of the plurality of pixel signals; and a unit configured to detect the singular point based on the output signal value from the stochastic resonance processing unit for each of the plurality of pixel signals, wherein the stochastic resonance processing unit performs the binarization processing on a pixel as a processing target among the plurality of pixel signals based on the pixel signal of the pixel as the processing target and a pixel signal of a pixel adjacent to the pixel as the processing target in a predetermined direction.

According to a second aspect of the present invention, there is provided an image processing method for detecting a singular point from image data having a plurality of pixel signals arranged in a two-dimensional manner, comprising: a stochastic resonance processing step of performing parallel steps in each of which a noise is added to and the result is subjected to binarization processing, synthesizing the results of the parallel steps and outputting the result, with regard to each of the plurality of pixel signals; and a step of detecting the singular point based on the output signal value from the stochastic resonance processing step for each of the plurality of pixel signals, wherein the stochastic resonance processing step performs the binarization processing on a pixel as a processing target among the plurality of pixel signals based on the pixel signal of the pixel as the processing target and a pixel signal of a pixel adjacent to the pixel as the processing target in a predetermined direction.

According to a third aspect of the present invention, there is provided an A non-transitory computer-readable storage medium which stores a program for allowing a computer to execute an image processing method for detecting a singular point from image data having a plurality of pixel signals arranged in a two-dimensional manner, the image processing method comprising: a stochastic resonance processing step of performing parallel steps in each of which a noise is added to and the result is subjected to binarization processing, synthesizing the results of the parallel steps and outputting the result, with regard to each of the plurality of pixel signals; and a step of detecting the singular point based on the output signal value from the stochastic resonance processing step for each of the plurality of pixel signals, wherein the stochastic resonance processing step performs the binarization processing on a pixel as a processing target among the plurality of pixel signals based on the pixel signal of the pixel as the processing target and a pixel signal of a pixel adjacent to the pixel as the processing target in a predetermined direction.

Further features of the present invention will become apparent from the following description of exemplary embodiments (with reference to the attached drawings).

BRIEF DESCRIPTION OF THE DRAWINGS

FIGS. 8A and 8B illustrate one example of read image data;

FIGS. 9A to 9C illustrate the direction of a hysteresis processing;

FIGS. 15A and 15B show the threshold values used in the second embodiment; and

DESCRIPTION OF THE EMBODIMENTS

FIGS. 3A to 3D illustrate the embodiment of an image processing apparatus 1 that can be used as a signal extraction processing apparatus of the present invention. The image processing apparatus of the present invention is used to subject imaged image data to a popup processing to allow a user to more easily recognize a white stripe in a printed image for example or a processing for the determination by the apparatus itself. The image processing apparatus of the present invention can take various system forms.

Figure 3A:
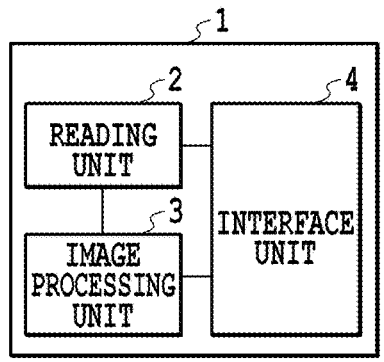
FIGS. 3A to 3D show an embodiment of an image processing apparatus that can be used in the present invention.

FIG. 3A illustrates an embodiment in which the image processing apparatus 1 includes a reading unit 2. For example, this correspond to a case where a sheet on which a predetermined image is printed by the inkjet printing apparatus is placed on the reading base of the reading unit 2 in the image processing apparatus 1 and is imaged by an optical sensor for example and the image data is processed by an image processing unit 3. The image processing unit 3 includes a CPU or an image processing accelerator providing a processing having a higher speed than that of the CPU and controls the reading operation by the reading unit 2 and subject received image data to a predetermined inspection processing for example.

Figure 3B:
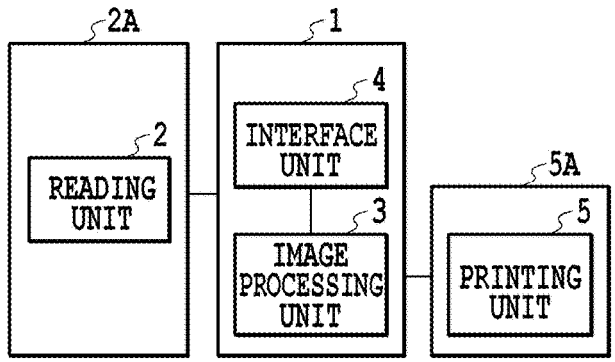

FIG. 3B illustrates an embodiment in which the image processing apparatus 1 is externally connected to a reading apparatus 2A including the reading unit 2. For example, this corresponds to a system in which a scanner is connected to a PC for example. A general connection method such as USB, GigE, or CameraLink may be used. The image data read by the reading unit 2 is provided via an interface 4 to the image processing unit 3. The image processing unit 3 subjects the received image data to a predetermined inspection processing. In the case of this embodiment, the image processing apparatus 1 also may be further externally connected to a printing apparatus 5A including a printing unit 5.

Figure 3C:
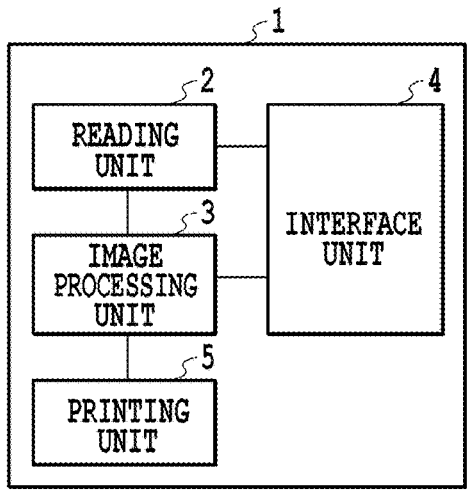

FIG. 3C illustrates an embodiment in which the image processing apparatus 1 includes the reading unit 2 and the printing unit 5. This corresponds to a complex machine including a scanner function, a printer function, and an image processing function for example. The image processing unit 3 controls all operations such as the printing operation in the printing unit 5, the reading operation in the reading unit 2, and the inspection processing to an image read by the reading unit 2.

Figure 3D:
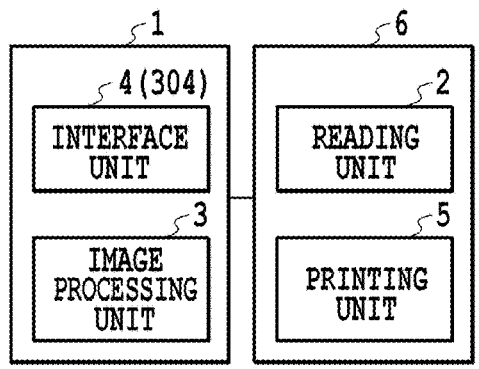

FIG. 3D illustrates an embodiment in which a complex machine 6 including the reading unit 2 and the printing unit 5 is externally connected. This corresponds to a system in which a complex machine including both of a scanner function and a printer function is connected to a PC for example. The image processing apparatus 1 of the present invention also can take any of the forms shown in FIG. 3A to 3D. However, the following section will describe the image inspection apparatus using the embodiment of FIG. 3D.

First Embodiment

Figure 4:
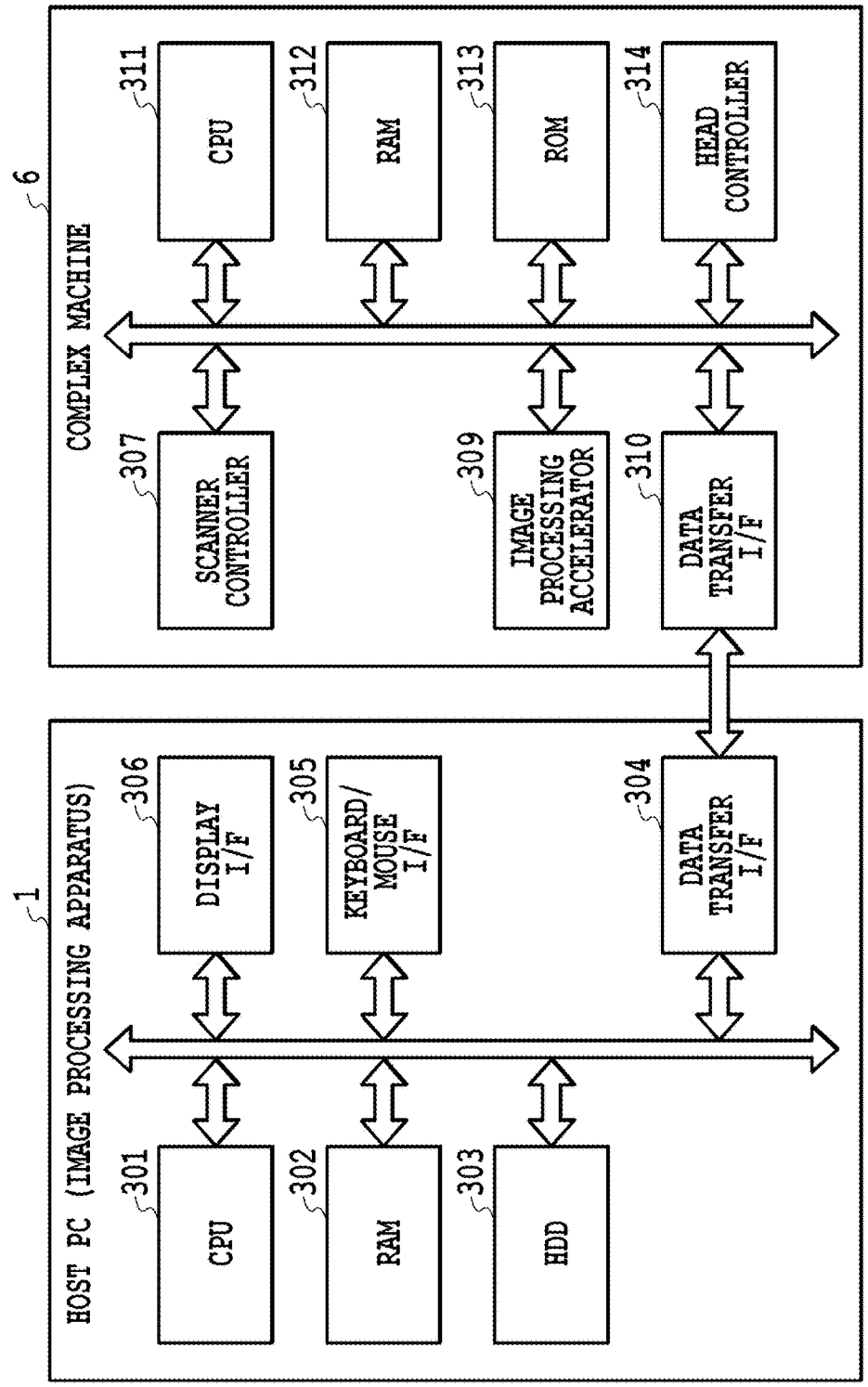
FIG. 4 is a block diagram to explain the configuration of the control in the first embodiment.

FIG. 4 is a block diagram for explaining the control configuration in the embodiment of FIG. 3D. The image processing apparatus 1 as a signal extraction processing apparatus consists of a host PC for example. A CPU 301 executes various processing while using a RAM 302 as a work area in accordance with a program retained in an HDD 303. For example, the CPU 301 generates image data that can be printed by the complex machine 6 based on a command received from a user via a keyboard/mouse I/F 305 or a program retained in the HDD 303 and transfers this to the complex machine 6. The CPU 301 subjects the image data received from the complex machine 6 via a data transfer I/F 304 to a predetermined processing based on the program stored in the HDD to display the result or various pieces of information on a not-shown display via a display I/F 306. Image data I(x), which is a target of the stochastic resonance processing of this embodiment as described later, is received from the complex machine 6 via the data transfer I/F 304.

On the other hand, in the complex machine 6, a CPU 311 executes various processing while using a RAM 312 as a work area based on a program retained by a ROM 313. The complex machine 6 includes an image processing accelerator 309 for performing a high-speed image processing, a scanner controller 307 for controlling the reading unit 2, and a head controller 314 for controlling the printing unit 5.

The image processing accelerator 309 is a hardware that can execute an image processing at a higher speed than the CPU 311. The image processing accelerator 309 is activated by allowing the CPU 311 to write parameters required for the image processing and data to the predetermined address of the RAM 312. After the above parameters and data are read, the data is subjected to a predetermined image processing. However, the image processing accelerator 309 is not an indispensable element. Thus, a similar processing can be executed by the CPU 311.

The head controller 314 supplies printing data to a printing head 100 provided in the printing unit 5 and controls the printing operation of the printing head 100. The head controller 314 is activated by allowing the CPU 311 to write printing data that can be printed by the printing head 100 and control parameters to a predetermined address of the RAM 312 and executes ejection operation based on the printing data.

The scanner controller 307 outputs, while controlling the individual reading elements arranged in the reading unit 2, RGB brightness data obtained therefrom to the CPU 311. The CPU 311 transfers the resultant RGB brightness data via the data transfer I/F 310 to the image processing apparatus 1. The data transfer I/F 304 of the image processing apparatus 1 and the data transfer I/F 310 of the complex machine 6 can be connected by a USB, IEEE1394, or LAN for example.

Figure 5:
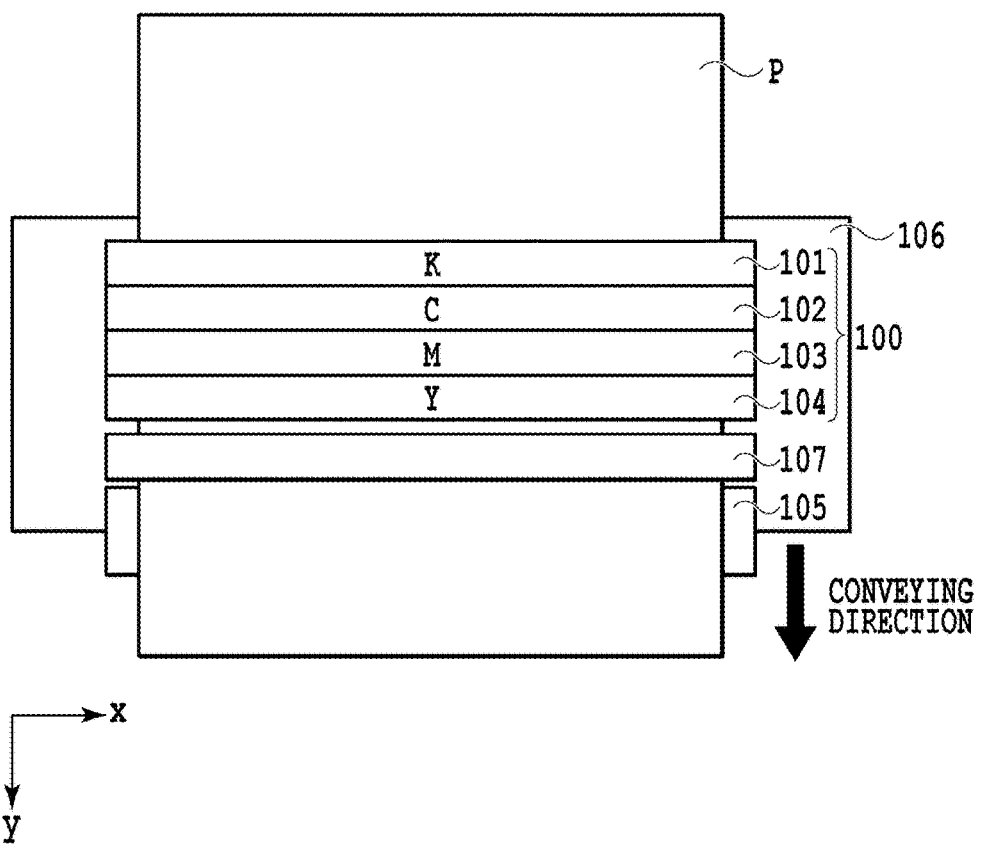
FIG. 5 is a schematic view illustrating the configuration of the inkjet printing apparatus.

FIG. 5 is a schematic view illustrating the configuration of an inkjet printing apparatus that can be used as the complex machine 6 of this embodiment (hereinafter also may be simply referred to as a printing apparatus). The printing apparatus of this embodiment is a full line-type printing apparatus in which the printing head 100 having a width similar to that of the sheet P that may be a printing medium or an inspection target and the reading head 107 are parallelly arranged in a Y direction. The printing head 100 includes 4 columns of printing element columns 101 to 104 through which inks of black (K), cyan (C), magenta (M), and yellow (Y) are ejected, respectively. These printing element columns 101 to 104 are parallelly arranged in a conveying direction of the sheet P (Y direction). At a further downstream of the printing element columns 101 to 104, the reading head 107 is provided. The reading head 107 includes therein a plurality of reading elements for reading a printed image arranged in the X direction.

In order to perform printing processing or reading processing, the sheet P is conveyed at a predetermined speed in accordance with the rotation of a conveying roller 105 in the Y direction of the drawing. During this conveyance, the printing processing by the printing head 100 or the reading processing by the reading head 107 is performed. The sheet P at a position at which the printing processing by the printing head 100 or the reading processing by the reading head 107 is performed is supported from the lower side by a platen 106 consisting of a flat plate to thereby maintain the distance from the printing head 100 or the reading head 107 and the smoothness.

Figure 6A:
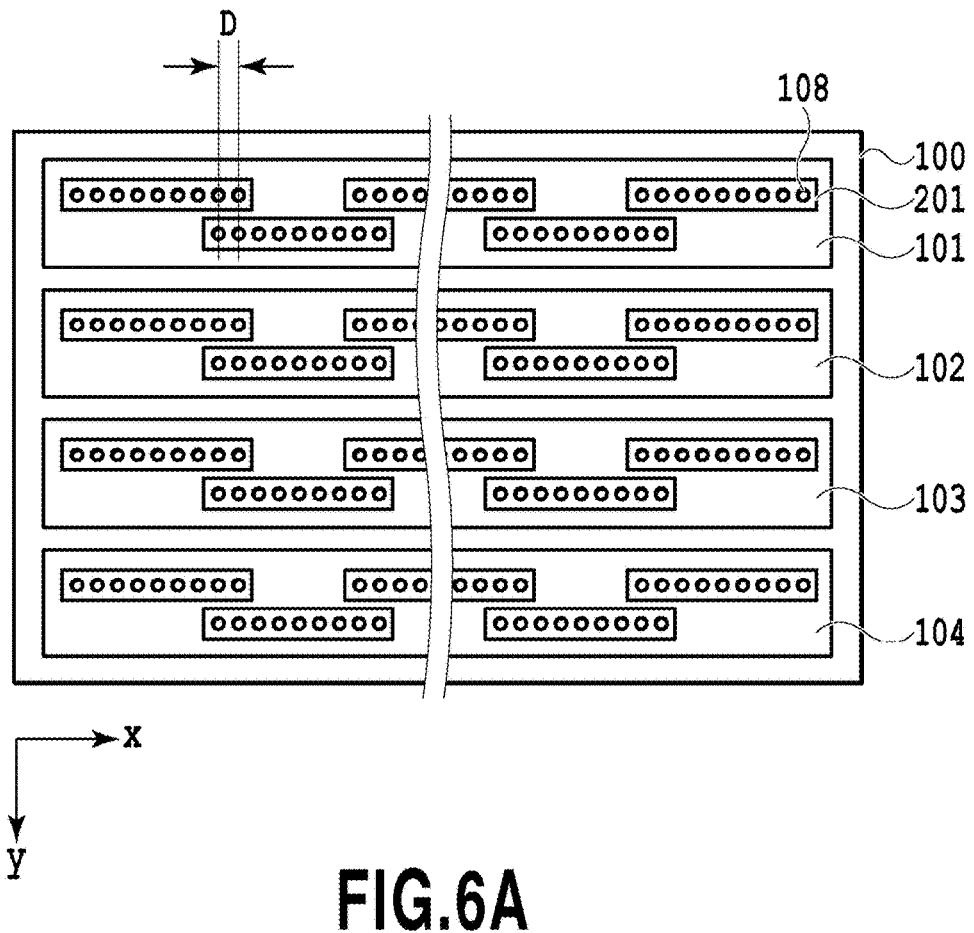
FIGS. 6A and 6B illustrate the arrangement configuration of printing elements of a printing head and reading elements of a reading head.
Figure 6B:
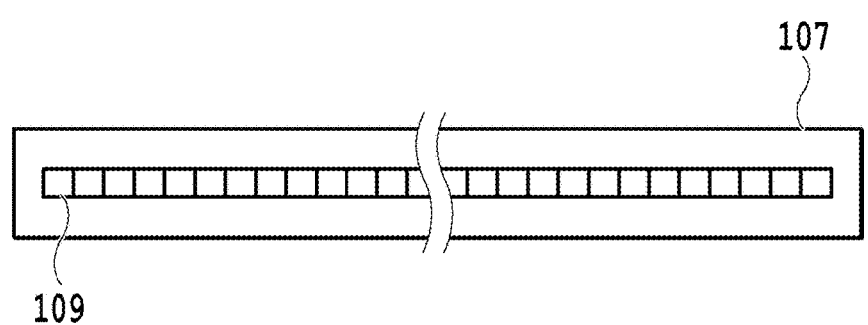

FIGS. 6A and 6B illustrate the arrangement configuration of printing elements in the printing head 100 and the arrangement configuration of reading elements in the reading head 107. In the printing head 100, the printing element columns 101 to 104 corresponding to the respective ink colors are configured so that a plurality of printing element substrates 201 in which a plurality of printing elements 108 are arranged at a fixed pitch are alternately arranged in the Y direction so as to be continuous in the X direction while having the overlap region D. To the sheet P conveyed at a fixed speed in the Y direction, ink is ejected through the individual printing elements 108 based on the printing data at a fixed frequency, thereby printing an image having the resolution corresponding to the arrangement pitch of the printing element 108 onto the sheet P is performed. If some defect such as ejection failure or a dislocated ejection direction occurs on a specific printing element 108, a white stripe or a black stripe extending in the Y direction appears on the sheet P.

Figure 7A:
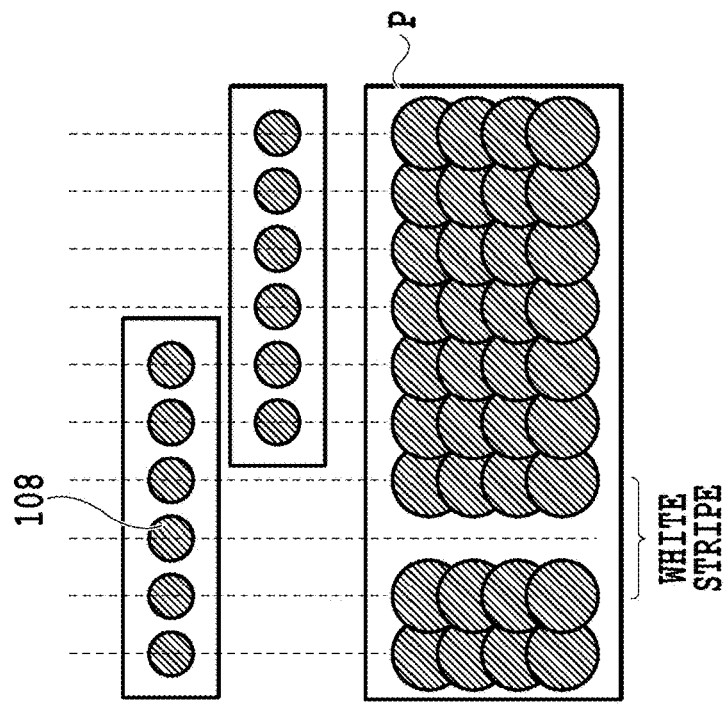
FIGS. 7A and 7B are a diagram to explain a white stripe due to defective ejection.
Figure 7B:
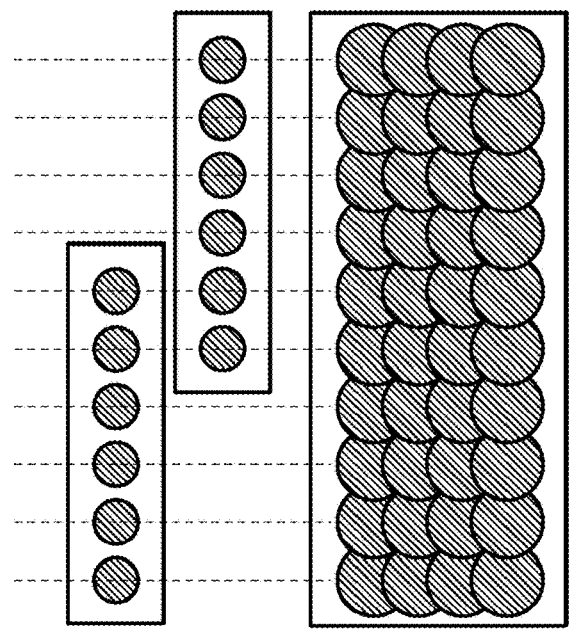

FIGS. 7A and 7B are a diagram to explain a white stripe caused by an ejection failure of a printing element that should be extracted as a singular portion in particular in this embodiment. FIGS. 7A and 7B illustrate the layout showing how printing elements are arranged in one of the printing element columns 101 to 104 shown in FIG. 6A and the layout of dots printed on the sheet P by the individual printing elements. FIG. 7A illustrates a status in which any printing element has no ejection failure while FIG. 7B illustrates a status in which the printing element 108 has an ejection failure. When a certain printing element has an ejection failure, as shown in FIG. 7B, no dot is placed in a region to be printed by the printing element, causing a white stripe extending in the Y direction to appear on the sheet P. This embodiment intends to securely extract such a white stripe as a singular portion.

On the other hand, the reading head 107 includes a plurality of reading sensors 109 arranged at a predetermined pitch in the X direction. Although not shown, the individual reading sensors 109 are arranged so that a plurality of reading elements that may be the minimum unit of a reading pixel are arranged in the X direction. The reading element of this embodiment outputs a multivalued brightness signal of red (R), green (G), and blue (B) as reading data. The image on the sheet P conveyed at a fixed speed in the Y direction can be imaged by the reading elements of the individual reading sensor 109 at a predetermined frequency to thereby read the entire image printed on the sheet P at an arrangement pitch of the reading elements.

FIGS. 8A and 8B illustrate one example of image data for printing by a printing element column and image data read by the reading head 107. Here, a case is shown in which one of the printing elements has ejection failure. Even when a printing operation is performed based on the uniform image data as in FIG. 8A, one printing element having an ejection failure causes a white stripe as shown in FIG. 7B on the sheet. In a case where such an image is read by the reading head 107, various pieces of noise are added to the image data, resulting in the data as shown in FIG. 8B. This embodiment has an objective of comparing the image data as in FIG. 8A with the read data as in FIG. 8B to securely extract a position at which a white stripe as a singular portion occurs.

Figure 1:
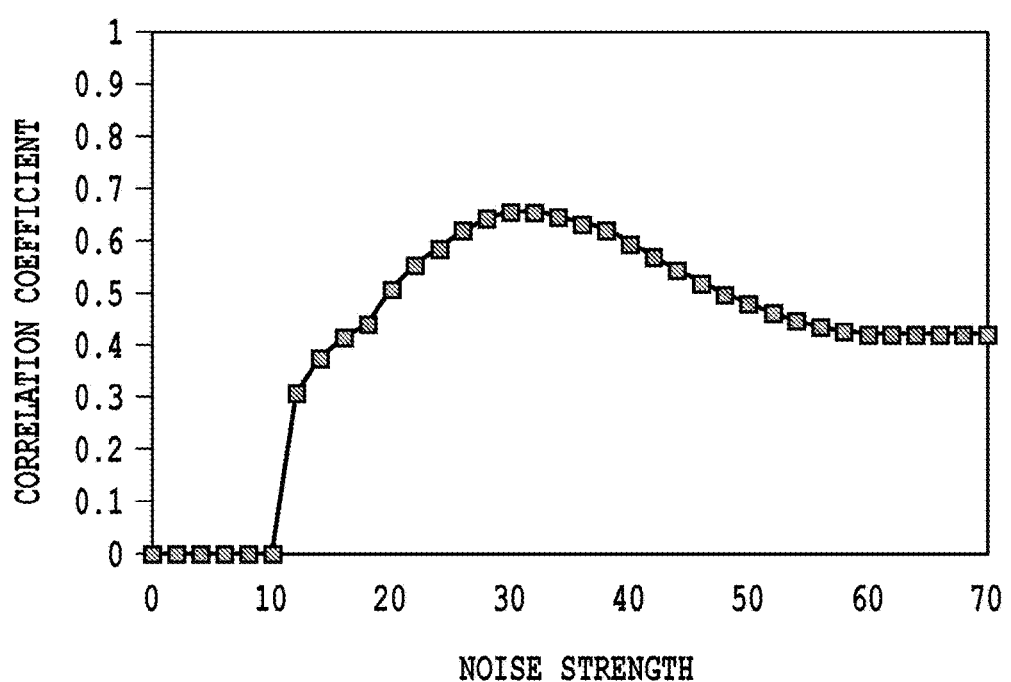
FIG. 1 illustrates the relation between an added noise strength and a correlation coefficient in a stochastic resonance processing.
Figure 2:
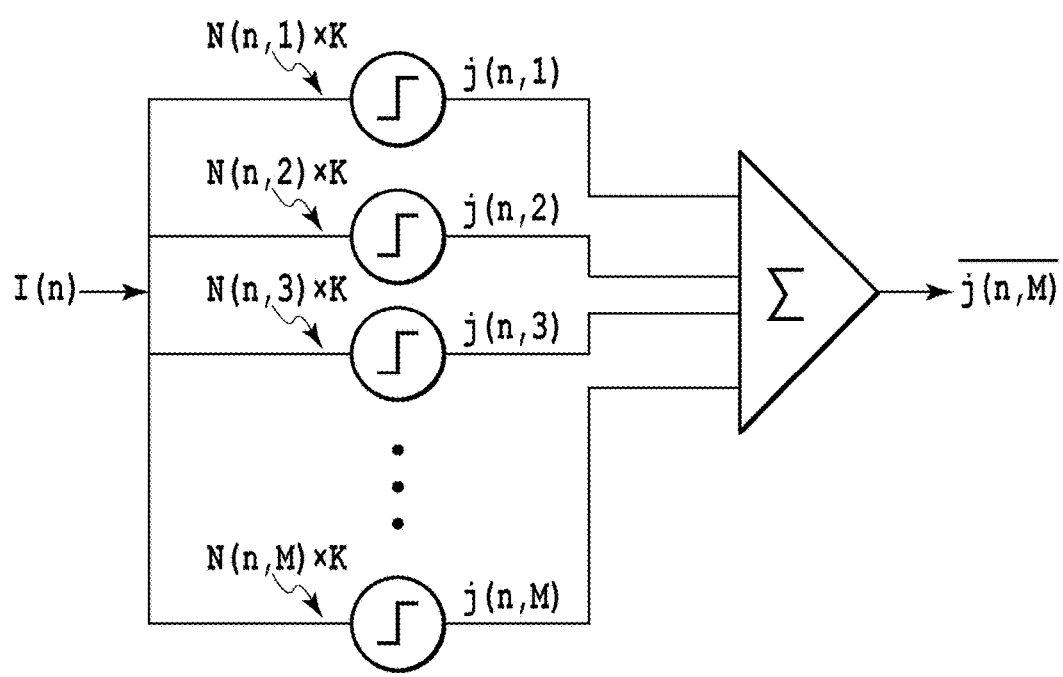
FIG. 2 illustrates the stochastic resonance processing disclosed in the Non-Patent document.

The following section will specifically describe a singular portion detection algorithm in this embodiment. The singular portion detection algorithm of this embodiment is an algorithm to read an already-printed image by the reading head 107 to accurately detect, from the resultant image data, a singular portion such as a white stripe using the stochastic resonance processing. This embodiment is not limited to an inkjet printing apparatus as the complex machine 6. However, the following description will be made based on an assumption that an image printed by the printing head 100 of the complex machine 6 is read by the reading head 107 of the same complex machine. First, reference is made again to FIG. 2 in order to explain the stochastic resonance processing of the Non-Patent document used in this embodiment.

An input signal I(n) shows a brightness signal value corresponding to the individual pixel read by the reading sensor 109 and "n" shows the pixel position. The input signal I(n) is branched to M pieces and the respective pieces are added with different noises N(n,m)×K. Here, "m" is a parameter showing one of M branch paths and is an integer in the range from 1 to M. N(n,m) shows a random number corresponding to the branch path m of the pixel position n and has a value in the range from 0 to 1. The value N(n,m)×K obtained by multiplying the random number N(n,m) with the noise strength K as an integer is added to the input signal I(n), thereby calculating the signal value i(n,m) after the noise addition.

$$i(n,m)=I(n)+N(n,m)\times K \quad \text{(Formula 1)}$$

Thereafter, by comparing the signal value i(n,m) after the noise addition with a predetermined threshold value T, a nonlinear processing (binary processing) is performed to thereby obtain a binary signal j(n,m). Specifically, the following is established.

$$i(n,m) \geq T \rightarrow j(n,m)=1$$

$$i(n,m)<T \rightarrow j(n,m)=0 \quad \text{(Formula 2)}$$

Then, M pieces of j(n,m) are synthesized and the result is subjected to an averaging processing, thereby obtaining an output signal value J(n) after the stochastic resonance at the pixel (n).

$$J(n) = \frac{1}{M}\sum_{m=1}^{M} j(n,m) \quad \text{(Formula 3)}$$

This embodiment is characterized in that the processing of the Non-Patent document further uses the individual branch paths m having hysteresis characteristics. Specifically, with regard to the same branch path m, the result of the binarization processing j(n,m) at the target pixel (n) is caused to depend on the binarization processing result of the adjacent pixel (n−1). During this, the direction in which the adjacent pixel (n−1) is adjacent to the target pixel (n) (i.e., the hysteresis processing direction) can be variously set.

FIGS. 9A to 9C show the hysteresis processing direction that can be used in the singular portion detection algorithm of this embodiment. The image data read by the reading head 107 is a collection of pixel signals (brightness signals) arranged in an XY plane in a two-dimensional manner. The position of each pixel can be represented by (x,y). FIG. 9A shows a case where the hysteresis processing is performed in the Y direction. Specifically, assuming that the target pixel (n) has a coordinate (x,y), then the pixel (n+1) has a coordinate (x,y+1) and the pixel (n−1) has a coordinate (x,y−1). However, in a case where the pixel (n) has a Y coordinate having the maximum value My, then the pixel (n+1) has a coordinate (x+1,1).

On the other hand, FIG. 9B shows a case where the hysteresis processing is performed in the X direction. Specifically, assuming that the target pixel (n) has a coordinate (x,y), then the pixel (n+1) has a coordinate (x+1,y) and the pixel (n−1) has a coordinate (x−1,y). However, in a case where the pixel (n) has an X coordinate having the maximum value Mx, then the pixel (n+1) has a coordinate (1,y+1). In any of these cases, the pixel (n) to be processed first has a coordinate (1,1).

As already described above, this example has an objective of extracting a white stripe extending in the Y direction as a singular portion. Generally, a pixel position including a white stripe has a brightness signal value higher than that of the peripheral ones and the binarization processing result tends to be 1. However, since the brightness signal is buried in noise, even the position of a white stripe does not always result in the binarization processing result of 1 for all pixels. In consideration of this, in this embodiment, the hysteresis processing is performed in the direction in which a white stripe extends (i.e., in an order as shown in FIG. 9A) to reflect the result for the coordinate (x,y−1) upon the coordinate (x,y) so that the result for the coordinate (x,y) is reflected upon the coordinate (x,y+1).

Figure 10:
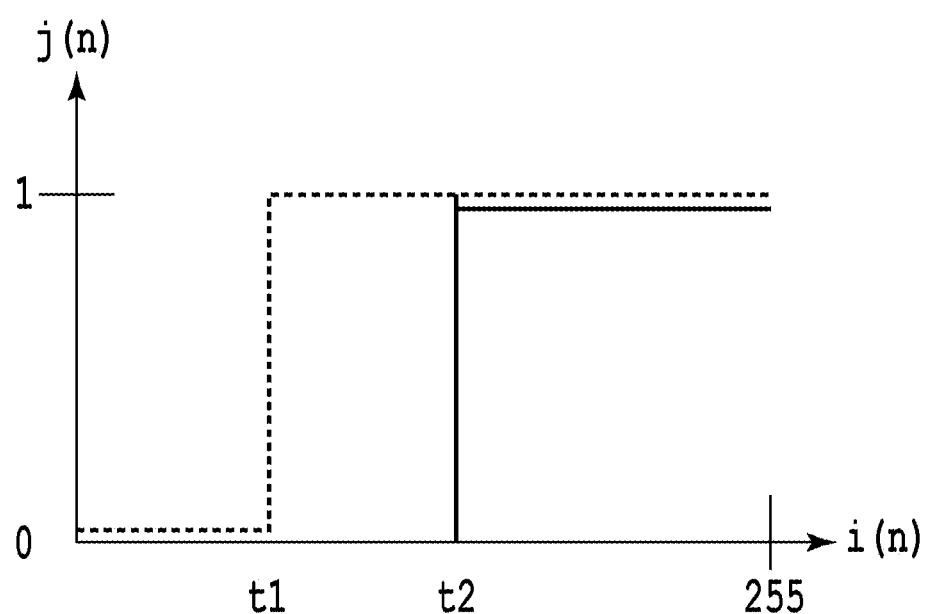
FIG. 10 shows threshold values of two stages and a binarization processing result j (n,m)

FIG. 10 illustrates values t1 and t2 of two stages prepared in this embodiment for the threshold value T and the binarization processing result j(n,m). The two threshold values have a relation of t1<t2. In this embodiment, the signal value i(n,m) of the individual pixel is compared with these threshold values t1 and t2 of two stages at first and a ternarizing processing is performed to obtain j'(n,m). Specifically, the following formula (Formula 4) is used.

$$i(n,m) \geq t2 \rightarrow j'(n,m)=1$$

$$t1 \leq i(n,m) < t2 \rightarrow j'(n,m)=P$$

$$i(n,m)<t1 \rightarrow j'(n,m)=0 \quad \text{(Formula 4)}$$

With regard to a pixel for which j'(n,m)=0 or j'(n,m)=1 is established, then the ternarized value is directly used as a binarization value.

$$j(n,m)=j'(n,m) \quad \text{(Formula 5)}$$

On the other hand, with regard to the pixel (n) for which j'(n,m)=P is established, i.e., the pixel (n) for which t1≤i(n,m)<t2 is established, the binarization processing is performed based on the result of the ternarizing processing j'(n−1,m) for the adjacent pixel (n−1). Specifically, the following formula (Formula 6) is used.

$$j'(n-1,m)=0 \rightarrow j(n,m)=0$$

$$j'(n-1,m)=P \rightarrow j(n,m)=0$$

$$j'(n-1,m)=1 \rightarrow j(n,m)=1 \quad \text{(Formula 6)}$$

That is, in this embodiment, the above (Formula 4) to (Formula 6) are used for performing the binarization processing. By doing this, the binarization processing result tends to be 1 for a pixel adjacent in the Y direction to a pixel for which the ternarizing processing result is 1 (a pixel having a sufficiently-high brightness). Thus, the above ternarizing processing can have an influence only on pixels continuing in the Y direction in which dots are printed by the same printing element and can be prevented from having an influence on pixels adjacent to each other in the X direction in which dots are printed by different printing elements. This can consequently provide the secure extraction of a white stripe extending in the Y direction caused by the ejection failure of the same printing element.

In the above description, the hysteresis processing was performed in the direction as shown in FIG. 9A for the purpose of extracting a white stripe caused by the ejection failure of the printing element. However, this embodiment is not limited to such an embodiment. For example, the hysteresis processing is preferably performed in the direction shown in FIG. 9B in the case where a white stripe extending in the X direction appears due to the eccentricity of a conveyance roller 105 and the uneven driving of the conveyance motor. By doing this, the binarization processing result tends to be 1 with regard to a pixel adjacent in the X direction to a pixel for which the ternarizing processing result is 1. That is, the white stripe extending in the X direction can be extracted more actively.

Figure 11:
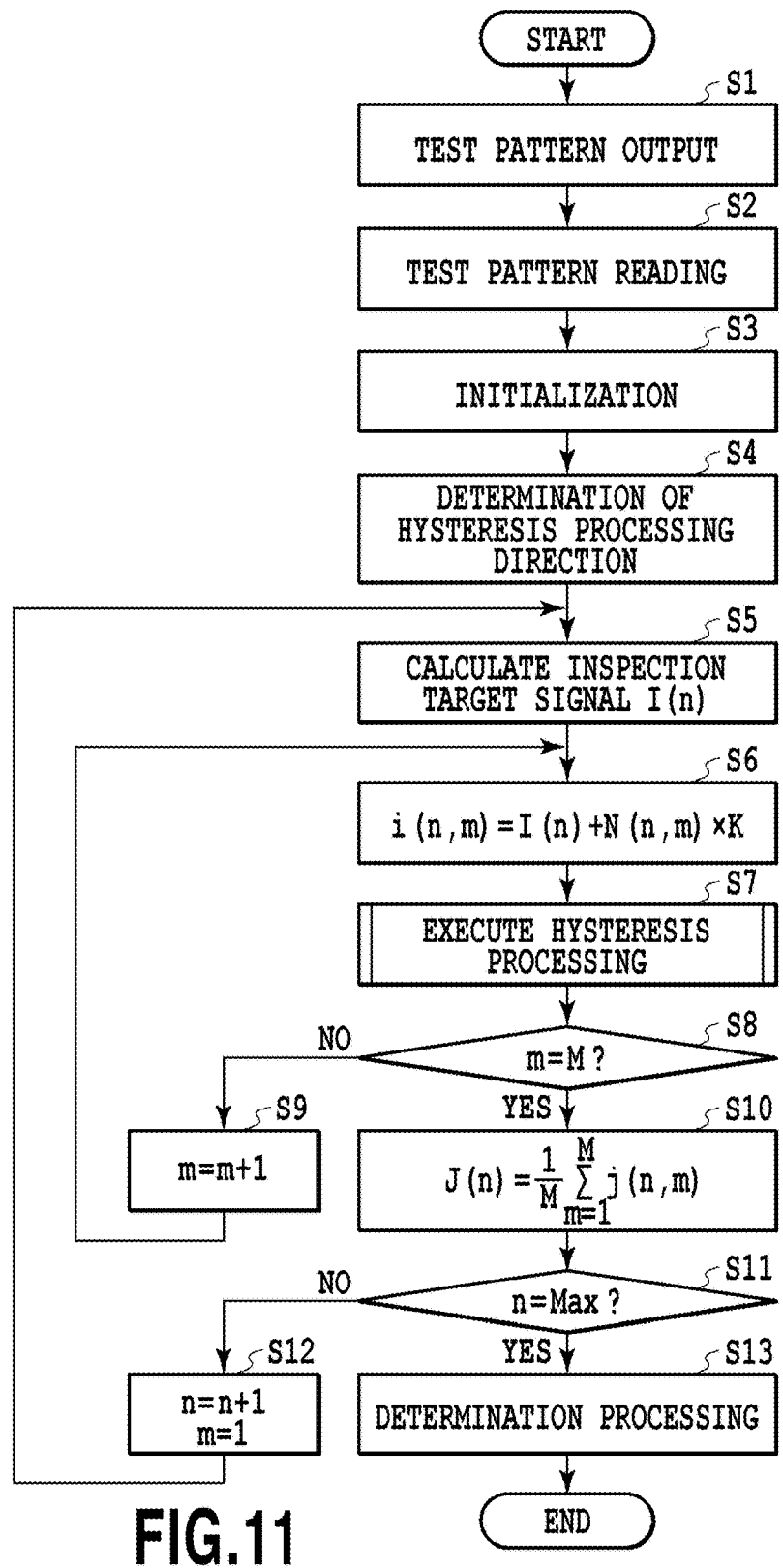
FIG. 11 is a flowchart illustrating a singular portion detection algorithm in the first embodiment.

FIG. 11 is a flowchart for explaining the basic steps of the singular portion detection algorithm executed by the CPU 301 of this embodiment. When this processing is started, then the CPU 301 in Step S1 causes the printing unit 5 to print an inspection pattern. Specifically, the CPU 301 accesses the CPU 311 of the complex machine 6 and cause it to supply the sheet P into the apparatus. Further, via the head controller 314, the CPU 301 causes the printing head 100 to print an inspection pattern for detecting ejection failures.

Next, in Step S2, the CPU 201 causes the reading unit 2 to read the inspection pattern printed by Step S1. Specifically, the scanner controller 307 is driven to obtain output signals from a plurality of reading elements arranged in the reading sensor 109. These signals are associated with the pixel position (x,y) and are stored in the RAM 312 as multi-valued RGB data.

In Step S3, the CPU 301 initializes the parameters n and m (n=1,m=1). Here, "n" shows the pixel position arranged at the XY coordinate and the value thereof changes depending on the hysteresis processing direction. On the other hand, "m" shows one of the M arranged branch paths shown in FIG. 2.

In Step S4, the CPU 301 sets the hysteresis processing direction and acquires the threshold values t1 and t2 corresponding to the set direction. In order to extract a white stripe caused by an ejection failure, the direction of FIG. 9A is set. In the case of FIG. 9A, n=1 (initial value) as the first processing target corresponds to the pixel having the coordinate (x,y)=(1,1). The pixel (n=2) as the second processing target has a coordinate (x,y)=(1,2). Assuming that the maximum value in the Y direction at the XY coordinate is My, then the pixel as the n=(p·My+q)th processing target has a coordinate (p,q). In this way, based on the hysteresis processing direction set in Step S4 as described above, the pixel position shown by parameter n is determined.

In Step S5, the CPU 301 uses the Formula 7 to calculate, based on the RGB data obtained in Step S2, the inspection target signal I(n) of the pixel (n) as a processing target.

$$I(n)=R(n)\times 0.3+G(n)\times 0.6+B(n)\times 0.1 \quad \text{(Formula 7)}$$

In the formula, R(n), G(n), and B(n) show the RGB signal values corresponding to the pixel (n). In a case where the read RGB data is 8 bit data, then I(n) has a range from 0 to 255. In a case where the read RGB data is 16 bit data, then I(n) has a range from 0 to 65535. An example will be described in which the read RGB data is 8 bit data (0 to 255). The weighting coefficient (0.3, 0.6, 0.1) multiplied with the respective signal values RGB are an example and also can be appropriately adjusted depending on the feature of a to-be-extracted singular point, an ink color used to print a test pattern, or the color of the sheet for example.

In Step S6, the CPU 301 calculates the signal value i(n,m) after the noise addition based on the above-described Formula 1. Specifically, a random number N(n,m) specific to (n,m) is generated and is multiplied with a predetermined strength K. Then, the resultant value is added to the inspection target signal I(n) obtained in Step S5.

$$i(n,m)=I(n)+N(n,m)\times K \quad \text{(Formula 1)}$$

In this embodiment, the random number N(n,m) shows white noise for which the range from 0 to 1 is substantially uniformly generated.

In Step S7, the CPU 301 executes the hysteresis processing characterized in this embodiment to obtain the binarization data j(n,m) having a value of 0 or 1.

Figure 12:
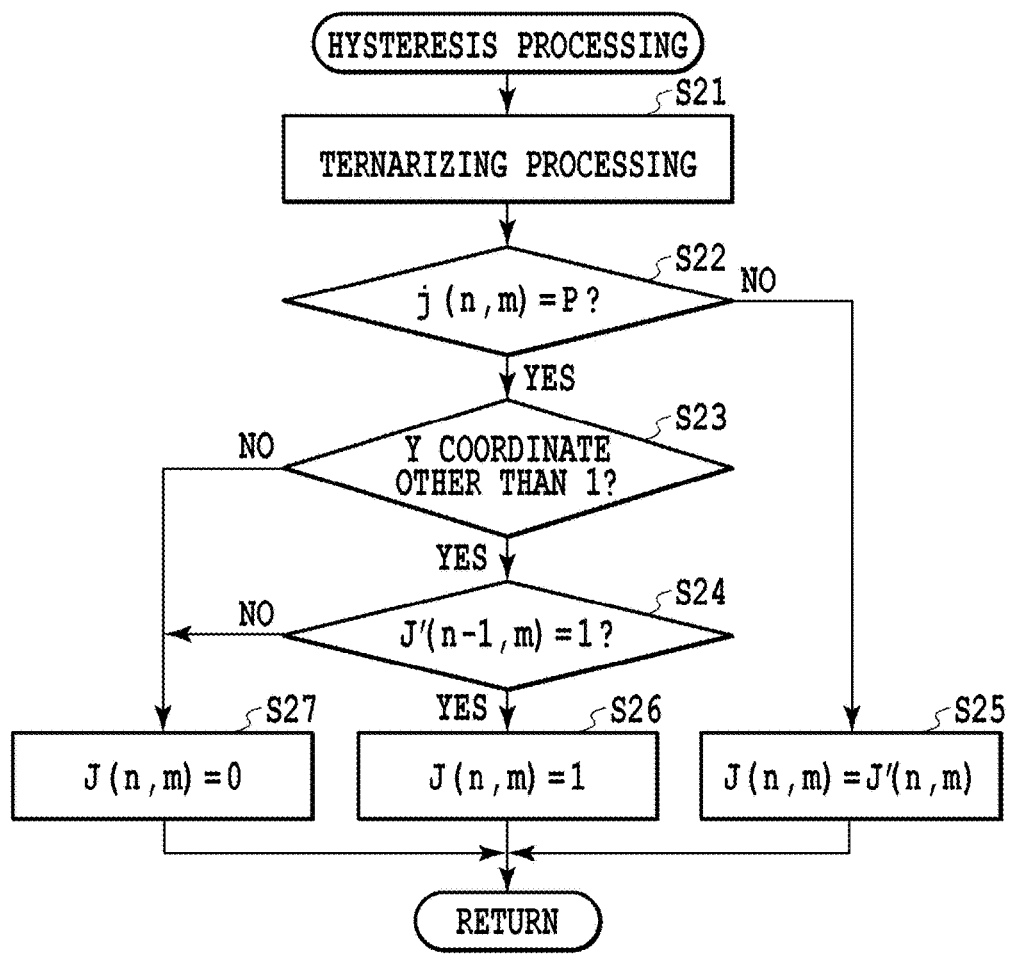
FIG. 12 is a flowchart illustrating a hysteresis processing in the first embodiment.

FIG. 12 is a flowchart to explain the hysteresis processing characterized in this embodiment executed in Step S7 of FIG. 11. When this processing is started, then the CPU 301 in Step S21 compares the threshold values t1 and t2 acquired in Step S4 with the signal value i(n,m) calculated in Step S6 to perform the ternarizing processing based on (Formula 4), thereby providing the ternarized data j'(n,m) having any of the values 1, 0, and P.

Next, Step S22 determines whether or not the ternarized data satisfies j'(n,m)=P. in a case where j'(n,m)≠P is established, then the processing proceeds to Step S25 in which the current j'(n,m) is directly used as the binarization result based on (Formula 5). in a case where j'(n,m)=P is established on the other hand, then the processing proceeds to Step S23.

Step S23 determines whether or not the target pixel (n) has a Y coordinate of 1. In a case where the target pixel (n) has a Y coordinate of 1, then the target pixel (n) and the pixel (n−1) corresponds to different printing elements. Thus, the influence by the ternarizing processing result for the pixel (n−1) is not required for the binarization processing to the target pixel (n). Thus, the processing proceeds to Step S27 and, j(n,m)=0 is established.

On the other hand, in a case where Step S23 determines that the Y coordinate of the target pixel (n) is not 1, then the processing proceeds to Step S24 to confirm the ternarizing processing result j'(n−1,m) for the pixel (n−1). In a case where j'(n−1,m)≠1 is established, then the processing proceeds to Step S27 to establish j(n,m)=0. In a case where j'(n−1,m)=1 is established, then the processing proceeds to Step S26 and j(n,m)=1 is established. Then, this processing is completed.

Returning to FIG. 11, when the binarization data j(n,m) is obtained by the hysteresis processing, the CPU 301 proceeds to Step S8 to determine whether or not m=M is established. When m<M is established, the parameter m is incremented in Step S9 and the processing returns to Step S6 for a branch path not yet subjected to the stochastic resonance processing. In a case where m=M is established on the other hand, then j(n,m) is obtained for all of M branch paths. Thus, the processing proceeds to Step S10 to obtain the signal value J(n) after the stochastic resonance based on (Formula 3).

Next, Step S11 determines whether or not the parameter n reaches the maximum value. In a case where the parameter n does not reach the maximum value, then Step S12 increments the parameter n to return the parameter m to the initial value. Then, the processing returns to Step S5 in order to perform the stochastic resonance processing for the next pixel (n). In a case where Step S11 determines that the parameter n reaches the maximum value, i.e., the stochastic resonance processing is completed for all pixels arranged at the XY coordinate, then the processing proceeds to Step S13.

In Step S13, the determination processing is performed based on the stochastic resonance data J(n) obtained in Step S10 to extract a singular portion. The method of the determination processing performed in Step S13 is not particularly limited. For example, another method may be used to compare the stochastic resonance data J(n) with a determination threshold value D prepared in advance to extract J(n) exceeding the determination threshold value D as a position including a white stripe. Another method also may be used to calculate the average value of J(n) for all pixels arranged at the XY coordinate. A position having J(n) much higher than this average value also may be extracted as a position including a white stripe. Then, this processing is completed.

According to the above-described embodiment, the binarization processing of a pixel as a processing target in the stochastic resonance processing is performed based on the pixel signal of a pixel as a processing target and the pixel signal of a pixel adjacent to the pixel in a direction along which the white stripe extends. This consequently provides the extraction of the singular portion from the inspection target image in an accurate and efficient manner.

Modification Example

In the above-described hysteresis processing, as shown in FIGS. 9A and 9B, the binarization processing of the target pixel 901 was performed based on the ternarizing processing result of the one adjacent pixel 903. However, another configuration also may be used as shown in FIG. 9C for example in which the binarization processing of the target pixel 901 is performed based on the ternarizing processing result of a plurality of adjacent continuous pixels 903 and 904. For example, j(n,m)=1 may be established only in a case where two adjacent continuous pixels both show the result of "1" and j(n,m)=0 may be established in the case other than the above case. Another configuration also may be used in only a case where, among the L adjacent continuous pixels, the number of pixels for which j'(n,m)=1 is established is higher than the number of pixels for which j'(n,m) is other value, j(n,m)=1 is set for the target pixel 901.

In the flowchart described in FIG. 11 and FIG. 12, the stochastic resonance processing composed of the noise addition→the ternarizing processing→the binarization processing was performed for one pixel depending on the hysteresis processing direction. However, this embodiment is not limited to such an embodiment. Thus, after all pixels are subjected to the ternarizing processing based on (Formula 4), all pixels may be subjected to the binarization processing based on (Formula 5) and (Formula 6). On this occasion, the (Formula 6) may be carried out with regard to the ternarizing result for one or more pixels adjacent in the set hysteresis processing direction regardless of the processing order (n). Specifically, in a case where the hysteresis processing in the Y direction is performed for example, the binarization processing for pixel (x,y) may be performed while referring to a plurality of pixels (x,y±r) arranged in the Y direction around the pixel (x,y) as a center.

In any of the cases, by subjecting the target pixel to the binarization processing based on the result of the ternarizing processing for at least one pixels extending in a direction along which a singular portion extends, the singular portion such as a white stripe can be effectively extracted even if some noise is added to read data.

Second Embodiment

The second embodiment also uses the image processing system described in FIG. 4 to FIG. 6B as in the first embodiment. In the first embodiment, a case was described in which a singular portion whose extending direction in the image is clear is extracted, including a stripe caused by the ejection failure of a printing element and a stripe caused by the eccentricity of a conveyance roller for example. However, there may be a case where strips caused by different factors appear in directions crossing one another in the inspection target image. This embodiment will describe a configuration in which these singular portions can be favorably extracted even in such a case.

Figure 13:
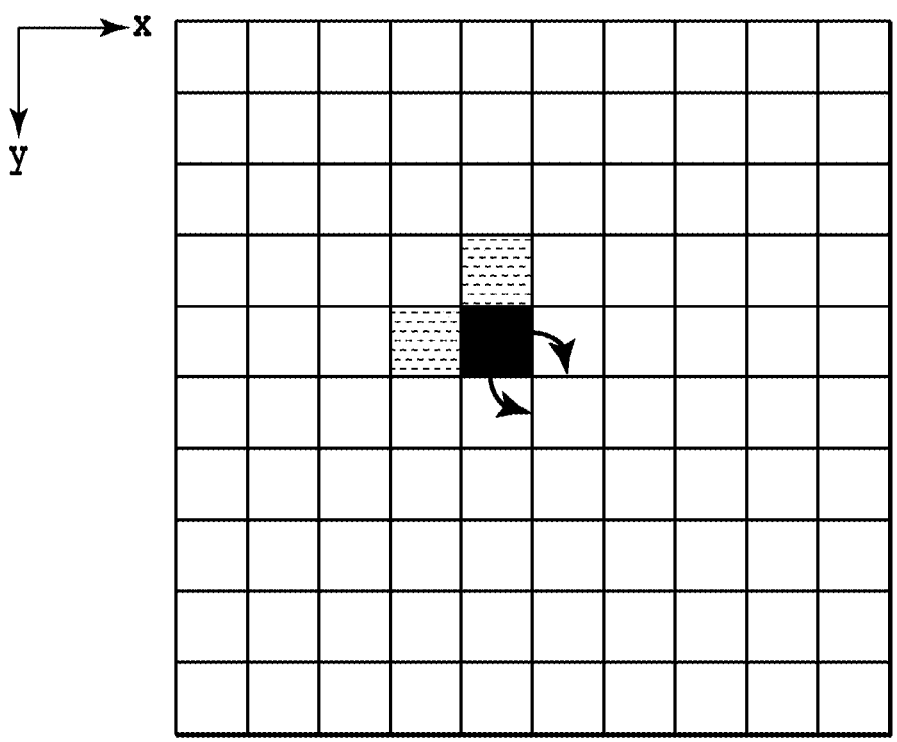
FIG. 13 shows the direction of the hysteresis processing in the second embodiment.

FIG. 13 shows the hysteresis processing direction in the singular portion detection algorithm of this embodiment. In this embodiment, the hysteresis processing in the X direction and the hysteresis processing in the Y direction are both performed. Specifically, it is assumed that the binarization processing result j(x,y) for an arbitrary pixel (x,y) have an influence on both of an adjacent pixel (x+1,y) in the X direction and an adjacent pixel (x,y+1) in the Y direction.

Figure 14:
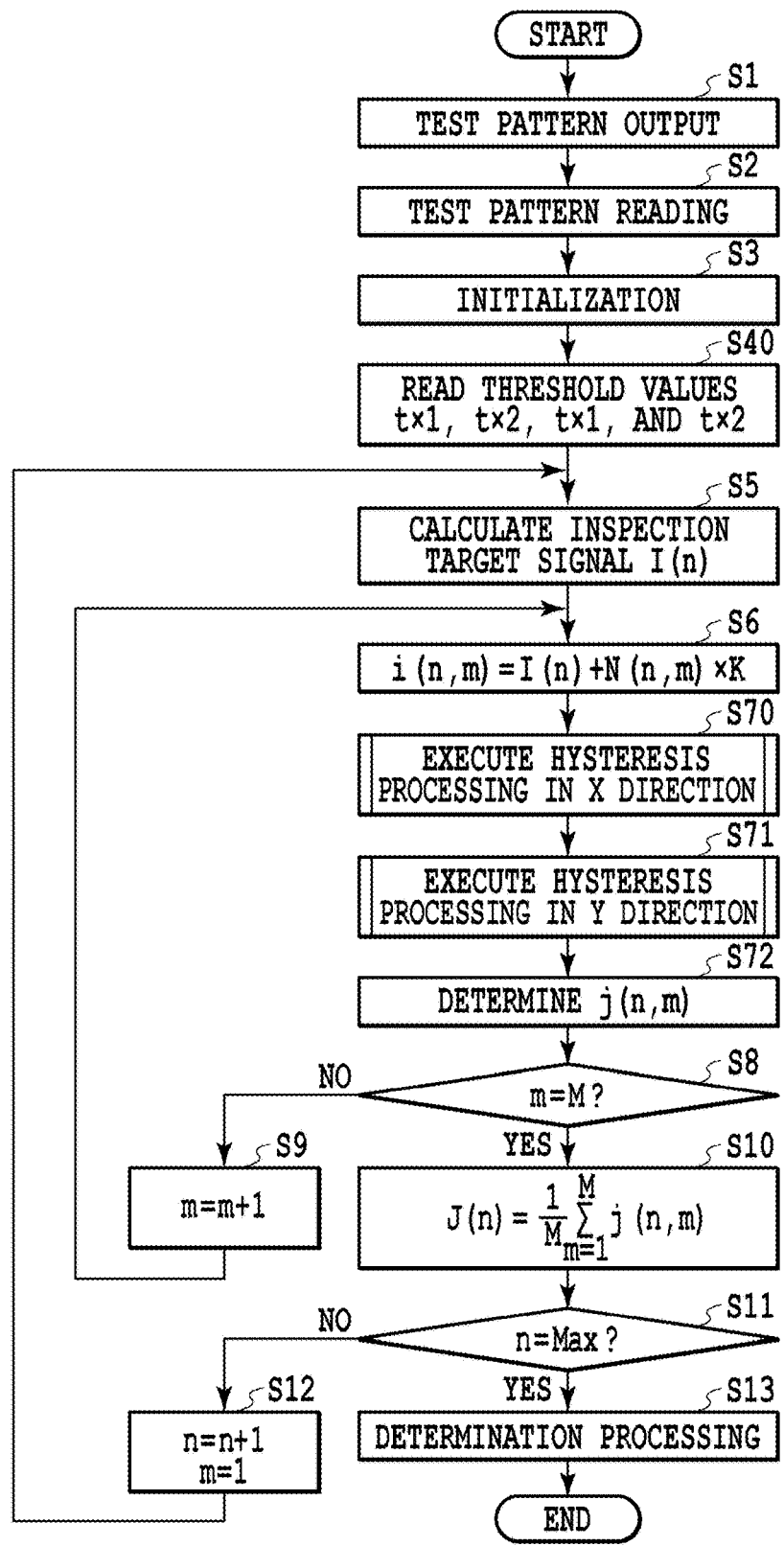
FIG. 14 is a flowchart illustrating the singular portion detection algorithm in the second embodiment.

FIG. 14 is a flowchart to explain the basic steps of the singular portion detection algorithm executed by the CPU 301 of this embodiment. The following section will describe only steps different from those of the flowchart of FIG. 11 described in the first embodiment.

In Step S40, the CPU 301 reads the threshold values tx1 and tx2 for the hysteresis processing in the X direction and the threshold values ty1 and ty2 for the hysteresis processing in the Y direction.

In Step S70, the CPU 301 performs the hysteresis processing in the X direction to obtain the binarization data jx(n,m). The basic contents are the same as those of the hysteresis processing described in FIG. 12. Specifically, the threshold values tx1 and tx2 are used to perform the ternarizing processing to obtain jx'(n,m). Then, with regard to a pixel for which jx'(n,m)=P is established, the binarization processing is performed based on the ternarizing processing result of a pixel adjacent thereto in the −X direction to obtain jx(n,m).

In Step S71, the hysteresis processing in the Y direction is performed to obtain the binarization data jy(n,m). Specifically, the threshold values ty1, and ty2 are used to perform the ternarizing processing to obtain jy'(n,m). Then, with regard to a pixel for which jy'(n,m)=P is established, the binarization processing is performed based on the ternarizing processing result for a pixel adjacent thereto in the −Y direction to obtain jy(n,m).

In Step S72, the binary data jx(n,m) obtained in Step S70 is compared with the binary data jy(n,m) obtained in Step S71 to determine final binary data j(n,m). A method of determining j(n,m) is not particularly limited. The determination may be made based on the following conditions.

$jx(n,m)=0$ and $jy(n,m)=0 \rightarrow j(n,m)=0$ $jx(n,m)=0$ and $jy(n,m)=1 \rightarrow j(n,m)=1$ $jx(n,m)=1$ and $jy(n,m)=0 \rightarrow j(n,m)=1$ $jx(n,m)=1$ and $jy(n,m)=1 \rightarrow j(n,m)=1$ After the binarization data j(n,m) is obtained by the processing as described above, then the processing after Step S8 may be performed as in the first embodiment.

By the way, the threshold values tx1 and tx2 for the hysteresis processing in the X direction in Step S40 and the threshold values ty1 and ty2 for the hysteresis processing in the Y direction can be different from one another.

FIGS. 15A and 15B show an example of these threshold values. FIG. 15A shows the threshold values tx1 and tx2 for the hysteresis processing in the X direction, and FIG. 15B shows the threshold values ty1 and ty2 for the hysteresis processing in the Y direction, respectively. Here, higher threshold values are mutually equal (tx2=ty2) while lower threshold values are different from each another (tx1>ty1). In this case, the number of pixels for which jy'(n,m)=P is established in the hysteresis processing in the Y direction is higher than the number of pixels for which jx'(n,m)=P is established in the hysteresis processing of the X direction. As a result, a white stripe extending in the Y direction is extracted with a higher sensitivity than a white stripe extending in the X direction. However, this embodiment is not limited to the magnitude relation of the threshold values as described above. For example, t2x and t2y can be set to further higher values so that only a clearer white stripe is extracted. Alternatively, in a case where a white stripe in the X direction clearly has higher brightness than that of a white stripe in the Y direction, tx2>tx1>ty2>ty1 also can be set. That is, a plurality of threshold values can be appropriately adjusted depending on the characteristic or status of a to-be-extracted singular portion.

In this embodiment, as in the modification example of the first embodiment, all pixels may be subjected to the ternarizing processing based on (Formula 4) and then all pixels may be subjected to the binarization processing based on (Formula 5) and (Formula 6). During this, the number of the adjacent pixels referred to in the hysteresis processing in the Y direction and the number of the adjacent pixels referred to in the hysteresis processing in the X direction may be different from each other so long as the former and the latter are adjusted depending on the characteristic or status of the singular portion in the respective directions.

According to the this embodiment described above, a white stripe extending in the X direction and a stripe extending in the Y direction can be both extracted effectively.

Other Embodiments

The above description has been made for an example in which the full line-type inkjet printing apparatus shown in FIG. 5 is used as the complex machine 6. However, the present invention is not limited such an embodiment. A printing unit using the serial type inkjet printing apparatus as shown in FIGS. 16A and 16B also can be used.

Figure 16A:
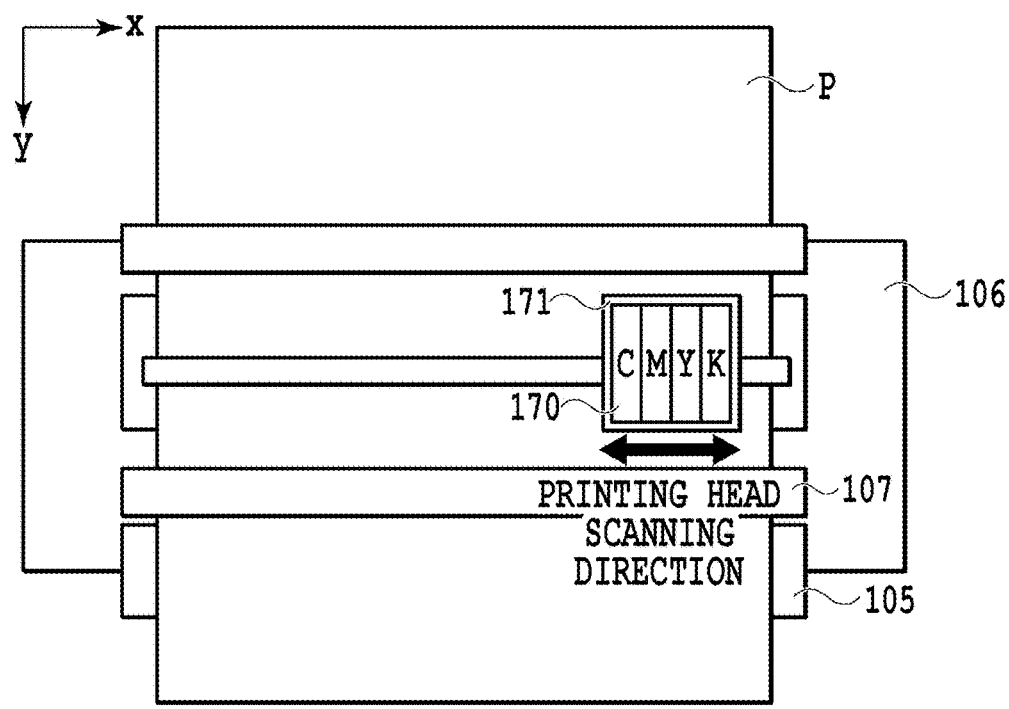
FIGS. 16A and 16B show a serial inkjet printing apparatus.
Figure 16B:
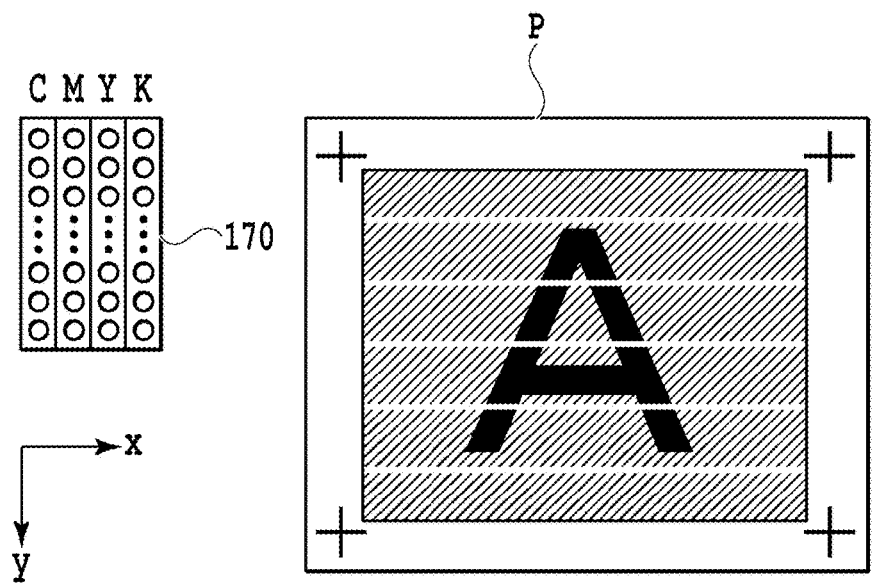

In FIG. 16A, the printing head 170 is reciprocated in the FIGS. 16A and 16B in the drawing while being provided on a carriage 171. During this travel, the respective inks of black (K), cyan (C), magenta (M), and yellow (Y) are ejected through four printing element columns, respectively. When one printing scanning is completed, the sheet P is conveyed in the Y direction by a distance corresponding to the printing width of the printing head 170. By alternately repeating the printing scanning and the conveying operation as described above, an image is formed on the sheet P. On the other hand, the reading head 107 is composed of a plurality of reading elements arranged in the X direction as in FIG. 5.

In a case where the serial type inkjet printing apparatus as in FIG. 16A includes a printing element having an ejection failure, a white stripe extends in the X direction as shown in FIG. 16B. Another white stripe caused by the conveying operation also extends in the X direction. That is, in the case of the serial-type printing apparatus, a stripe caused by a printing element having an ejection failure and a stripe caused by an error in the conveying operation similarly appear in the same direction. In a case where the invention is applied to such a complex machine, the hysteresis processing in the X direction as shown in FIG. 9B is preferably performed. The two threshold values t1 and t2 or the number of the adjacent pixels or the positions used for the hysteresis processing may be adjusted within a range within which a white stripe caused by the ejection failure of the printing element and a white stripe caused by an error in the conveyance operation can be both extracted preferably.

Although the above description has been made based on an example in which a white stripe is caused by an ejection failure, the above embodiment also can be used to extract a singular point having a brightness value lower than those of the surrounding points such as a black stripe or density unevenness caused by excessive ejection. Even in such a case, an effect similar to that of the above embodiment can be obtained by appropriately adjusting the two threshold values or the number of pixels used for the hysteresis processing or the positions thereof.

In the above description, a system as shown in FIG. 4 in which the complex machine 6 is connected to the image processing apparatus 1 has been described as an example. However, the invention is not limited to such an embodiment. The present invention also can be realized by a processing in which a program for realizing one or more functions of the above-described embodiment is supplied to the system or the apparatus via a network or a memory medium so that one or more processors in the system or the computer of the apparatus read and execute the program. Alternatively, the invention also can be realized by a circuit realizing one or more functions (e.g., ASIC).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-092798 filed May 2, 2016, which is hereby incorporated by reference wherein in its entirety.

What is claimed is:

1. An image processing apparatus for detecting a singular point from image data having a plurality of pixel signals arranged in a two-dimensional manner, comprising:
    a stochastic resonance processing unit configured to perform parallel steps in each of which a noise is added to and the result is subjected to binarization processing, synthesize the results of the parallel steps and output the result, with regard to each of the plurality of pixel signals; and
    a detection unit configured to detect the singular point based on the output signal value from the stochastic resonance processing unit for each of the plurality of pixel signals, wherein
    the stochastic resonance processing unit performs the binarization processing on a pixel as a processing target among the plurality of pixel signals based on the pixel signal of the pixel as the processing target and a pixel signal of a pixel adjacent to the pixel as the processing target in a predetermined direction.

2. The image processing apparatus according to claim 1, wherein
    the stochastic resonance processing unit adds the noise to the pixel signal of the pixel as the processing target to subsequently ternarize the pixel signal using two different threshold values to subject the pixel as the processing target to a binarization processing based on the ternarizing result of pixels adjacent to the pixel as the processing target in the predetermined direction.

3. The image processing apparatus according to claim 2, wherein
    the two threshold values are adjusted for the singular point as a detection target.

4. The image processing apparatus according to claim 1, wherein
    the predetermined direction includes a plurality of directions different from one another.

5. The image processing apparatus according to claim 1, wherein
    the image data is obtained by image-taking an image printed by a printing head in which a plurality of printing elements used for ejecting ink are arranged, and
    the predetermined direction includes a direction crossing the arrangement direction.

6. The image processing apparatus according to claim 1, wherein
    the stochastic resonance processing unit performs the binarization processing based on the pixel signal of the pixel as the processing target and pixel signals of a plurality of pixels continuously adjacent to the pixel as the processing target in the predetermined direction.

7. The image processing apparatus according to claim 1, further comprising a unit configured to acquire the image data by image-taking an image.

8. The image processing apparatus according to claim 7, further comprising a printing unit configured to print the image.

9. The image processing apparatus according to claim 1, wherein
    the noise is white noise.

10. An image processing method for detecting a singular point from image data having a plurality of pixel signals arranged in a two-dimensional manner, comprising:
    a stochastic resonance processing step of performing parallel steps in each of which a noise is added to and the result is subjected to binarization processing, synthesizing the results of the parallel steps and outputting the result, with regard to each of the plurality of pixel signals; and
    a step of detecting the singular point based on the output signal value from the stochastic resonance processing step for each of the plurality of pixel signals, wherein
    the stochastic resonance processing step performs the binarization processing on a pixel as a processing target among the plurality of pixel signals based on the pixel signal of the pixel as the processing target and a pixel signal of a pixel adjacent to the pixel as the processing target in a predetermined direction.

11. The image processing method according to claim 10, wherein
    the stochastic resonance processing step adds the noise to the pixel signal of the pixel as the processing target to subsequently ternarize the pixel signal using two different threshold values to subject the pixel as the processing target to a binarization processing based on the ternarizing result of pixels adjacent to the pixel as the processing target in the predetermined direction.

12. The image processing method according to claim 11, wherein
    the two threshold values are adjusted for the singular point as a detection target.

13. The image processing method according to claim 10, wherein
    the predetermined direction includes a plurality of directions different from one another.

14. The image processing method according to claim 10, wherein
    the image data is obtained by image-taking an image printed by a printing head in which a plurality of printing elements used for ejecting ink are arranged, and
    the predetermined direction includes a direction crossing the arrangement direction.

15. The image processing method according to claim 10, wherein
    the stochastic resonance processing step performs the binarization processing based on the pixel signal of the pixel as the processing target and pixel signals of a plurality of pixels continuously adjacent to the pixel as the processing target in the predetermined direction.

16. The image processing method according to claim 10, further comprising a step of acquiring the image data by image-taking an image.

17. The image processing method according to claim 16, further comprising a printing step of printing the image.

18. The image processing method according to claim 10, wherein
    the noise is white noise.

19. A non-transitory computer-readable storage medium which stores a program for allowing a computer to execute an image processing method for detecting a singular point from image data having a plurality of pixel signals arranged in a two-dimensional manner, the image processing method comprising:
    a stochastic resonance processing step of performing parallel steps in each of which a noise is added to and the result is subjected to binarization processing, synthesizing the results of the parallel steps and outputting the result, with regard to each of the plurality of pixel signals; and a step of detecting the singular point based on the output signal value from the stochastic resonance processing step for each of the plurality of pixel signals, wherein the stochastic resonance processing step performs the binarization processing on a pixel as a processing target among the plurality of pixel signals based on the pixel signal of the pixel as the processing target and a pixel signal of a pixel adjacent to the pixel as the processing target in a predetermined direction.

* * * * *